United States Patent
Ohtsu et al.

(10) Patent No.: US 6,928,034 B2
(45) Date of Patent: Aug. 9, 2005

(54) OPTICAL DISC APPARATUS AND METHOD FOR ADJUSTING A SERVO OF SAME

(75) Inventors: Hiroshi Ohtsu, Tokyo (JP); Toshisada Takada, Chiba (JP); Koichiro Takahashi, Yokohama (JP)

(73) Assignee: Sony Computer Entertainment Inc., Tokyo (JP)

( * ) Notice: Subject to any disclaimer, the term of this patent is extended or adjusted under 35 U.S.C. 154(b) by 29 days.

(21) Appl. No.: 10/024,589

(22) Filed: Dec. 17, 2001

(65) Prior Publication Data

US 2004/0008608 A1 Jan. 15, 2004

(30) Foreign Application Priority Data

Dec. 20, 2000 (JP) .................................. 2000-387528
Dec. 6, 2001 (JP) .................................. 2001-372784

(51) Int. Cl.⁷ .............................................. G11B 7/00
(52) U.S. Cl. ........................ 369/44.29; 369/44.25; 369/44.36
(58) Field of Search ................... 369/44.25, 44.27, 369/44.29, 44.32, 44.35, 44.36, 44.41, 53.18, 53.19, 53.38

(56) References Cited

U.S. PATENT DOCUMENTS

| 5,663,942 A | * | 9/1997 | Ishibashi et al. | 369/44.36 |
| 5,848,036 A | * | 12/1998 | Ishibashi et al. | 369/44.29 |
| 5,898,654 A | * | 4/1999 | Shimada et al. | 369/44.32 |
| 6,100,724 A | * | 8/2000 | Yoshimura et al. | 369/53.34 |
| 6,115,334 A | * | 9/2000 | Tsutsui et al. | 369/44.32 |
| 6,324,145 B1 | * | 11/2001 | Kobayashi et al. | 369/59.17 |
| 6,381,203 B1 | * | 4/2002 | Muramatsu | 369/53.18 |
| 6,392,971 B1 | * | 5/2002 | Takiguchi et al. | 369/44.25 |
| 6,430,119 B1 | * | 8/2002 | Okada et al. | 369/30.11 |
| 6,680,887 B2 | * | 1/2004 | Shihara et al. | 369/44.32 |
| 6,747,924 B1 | * | 6/2004 | Muramatsu | 369/44.29 |

FOREIGN PATENT DOCUMENTS

| EP | 0 609 882 | 8/1994 |
| EP | 0 840 295 | 5/1998 |
| EP | 1 043 717 | 10/2000 |
| JP | 06-231477 | 8/1994 |
| JP | 10-83543 | 3/1998 |
| JP | 2000-149282 | 5/2000 |

* cited by examiner

Primary Examiner—Thang V. Tran
(74) Attorney, Agent, or Firm—Katten Muchin Rosenman LLP

(57) ABSTRACT

In an optical disc apparatus, a minimum jitter value is established from each jitter value measured in correspondence to a successively changed servo constant, and multiplied by a prescribed ratio so as to set a jitter threshold value. Servo constants corresponding to at least two jitter values substantially equal to the jitter threshold value is established, and an optimum servo constant is set based on this minimum of two servo constants. By doing this, it is possible to quickly and accurately detect the optimum servo constant, and achieve good servo adjustment.

19 Claims, 14 Drawing Sheets

OPTICAL DISC APPARATUS AND METHOD FOR ADJUSTING A SERVO OF SAME

This application is related to Japanese Patent Application No. 2000-387528 filed on Dec. 20, 2000 and No. 2001-372784 filed on Dec. 6, 2001, based on which this application claims priority under the Paris Convention and the contents of which are incorporated herein by reference.

BACKGROUND OF THE INVENTION

1. Field of the Invention

The present invention relates to an optical disc apparatus in which a laser beam from an optical pickup is shone onto a recorded surface of an optical disc and information is read from the optical disc, a method for adjusting a servo of this optical disc apparatus, a computer-readable recording medium recording a servo adjustment program, and to a servo adjustment program.

2. Related Art

Optical disc apparatuses which accommodate various types of optical discs, such as a CD (Compact Disc), DVD (Digital Versatile Disc), CD-ROM (CD-Read Only Memory), DVD-ROM (DVD-Read Only Memory), and CD-R/RW (CD-Recordable/CD-ReWritable) in general have an optical pickup, which shines a laser beam onto a recorded surface and which performs reading from and writing to the disc of a signal, and an optical pickup moving mechanism, which causes the optical pickup to move to or to near to a desired track on the optical disc.

Of such optical disc apparatuses, there are types that have an automatic adjustment mechanism, which adjusts the relative distance (focus) or the relative angle (skew angle) between the optical disc and the optical pickup.

There are a variety of methods of achieving the above-noted automatic adjustment, and example of which being one whereby constants establishing such servo characteristics as skew angle or focus bias are changed by a prescribed step as variables and jitter values (jitter values of the RF signal read from the optical disc) are measured in correspondence to the changing variable values at each prescribed step are measured, the values of constants determining the servo characteristics being optimized based on the measured jitter values.

More specifically, in the above-noted method, for example as illustrated in FIG. 1, a jitter value that is larger than a minimum value Jal obtained by past measurements by a reference amount α is set as the jitter threshold value Jαth, and each jitter value (shown by the curve L in the drawing) are measured as the constant (SV) which establishes a servo characteristic is sequentially varied from a small value to a large value by a prescribed step, and of these jitter values a first variable value SVa corresponding to a first jitter value at point A in the drawing, which exceeds the jitter threshold value Jαth, and a second variable value SVb corresponding to a second jitter value at point B in the drawing are determined, and further a third variable value SVc, which is for example an intermediate point between the first variable value SVa and the second variable value SVb, is set so as to optimize a constant value establishing the above-noted servo characteristic. The above-noted constant for establishing a servo characteristic corresponds to a relative distance or relative angle between the recording surface of the optical disc and an optical pickup. The above-noted reference amount α is, for example, a fixed value established based on an upper limit value (for example the jitter threshold value Jαth for which a data error can be corrected when reading from the optical disc.

The above-noted jitter threshold value Jαth, as noted above, is set as a value that is an amount α greater than the minimum value of jitter Jal measured in the past, and if the fixed reference amount α is priorly set to a small amount so that the jitter threshold value Jαth is a small value, it is possible to shorten the amount of time to measure the above-noted optimum value from the first variable value SVa and the second variable value SVb. That is, in the case in which the first variable value SVa and the second variable value SVb are determined from the jitter values measured while the variable SV is sequentially changed from a small value to a large value, if the above-noted jitter threshold value Jαth is made a small value, the second variable value SVb is obtained particularly quickly, making it possible to quickly determine the above-noted third variable value SVc (optimum value).

There, however, are variations in the reflection characteristics of the recording surface of the optical disc, and variations in the characteristics of the various constituent elements of an optical playback apparatus. For this reason, because of the existence of these variations, even for the same value of constant that establishes the servo characteristic, the jitter value occurring in the RF signal is often different, there being cases in which the value is better and those in which the value is worse. In particular in the case in which the jitter value is worse, as shown by the curve Ld in FIG. 2, not only is there a rise in the jitter at the lowest part, but also there is an increase in the amount of change in the jitter value in response to the above-noted change in variable values.

Therefore, in the case in which, in order to shorten the time for setting the optimum value, the above-noted fixed reference amount is made a small value αd from the start, such as shown in FIG. 2, so that the jitter threshold value is a small value of Jαdth, if the jitter value worsens, such as shown by the curve Ld in the drawing, there is a risk that it will not be possible to achieve a first variable value SVad and a second variable value SVbd sufficient to set the above-noted optimum value. In particular in the case in which, for example, there is external disturbance, such as flaws in the optical disc or vibration or the like occurring during the jitter measurement, a suddenly occurring variation D will occur in the jitter value shown by the curve Ld, and if the jitter value of this variation D exceeds the jitter threshold value Jαdth, there will be an erroneous detection of the variable value SVd responsive to the jitter value of the variation D as the second variable value. As a result, the intermediate point variable value SVe between the erroneously detected variable value SVd (erroneous second variable value) and the first variable value is erroneously set as the optimum value of the constant that establishing the servo characteristic (that is, the third variable value).

If, for example, the reference amount α is made a large amount αg at the start, so that the jitter threshold value is a large value Jαgth, it is possible to obtain a first variable value and a second variable value sufficient for setting the above-noted optimum value. Thus, if the jitter threshold value Jαgth is used, even if a jitter variation D occurs suddenly, such as shown by the curve Ld in FIG. 2, because there is no erroneous detection of the variable value corresponding to the jitter value of the variation D as the second variable value, it is possible to set the intermediate point variable value (third variable value) between a non-erroneous second variable value and a first variable value as an optimum value of a constant for establishing the servo characteristic.

However, if the fixed reference amount α is priorly set to a large amount αg so that the jitter threshold amount is a large amount Jαgth, in the case in which the jitter is good, such as shown by the curve Lg in the drawing, for example, excessive time is required for the measurement of the above-noted optimum value. That is, when the jitter value improves, the curve Lg in FIG. 2 not only exhibits a reduction in the jitter at the lowest part, but also a reduction in the amount of change in the jitter with respect to the amount of change in the variable values. Because of this, there is a broadening of the span between the minimum jitter value Ag that exceeds the jitter threshold value and the maximum jitter value Bg, the time required to obtain these values of Ag and Bg becoming long, thereby resulting in an extremely long time required to obtain the third variable value SVf, which is the intermediate point between the second variable value SVbg and the first variable value SVag.

SUMMARY OF THE INVENTION

Accordingly, it is an object of the present invention, in view of the above-described problems, to provide an optical disc apparatus, a method, a computer-readable recording medium recording a program, and a program, all for performing adjustment of a servo of an optical disc apparatus, whereby, for example, it is possible to quickly and accurately detect an optimum constant for establishing a servo characteristic, and to achieve good servo adjustment.

The present invention establishes a minimum jitter value from jitter values measurement in correspondence to successively changed servo constants, multiplies this minimum jitter value by a prescribed ratio to set a jitter threshold value, establishes servo constants corresponding to at least two jitter values that are substantially equal to the jitter threshold value, and sets an optimum servo constant based on these servo constants.

More specifically, according to the present invention the minimum jitter value is a variable value because it is established by jitter values measured in correspondence with successively changed servo constants, and the jitter threshold value is a variable because it is established by multiplying the variable minimum jitter value by a prescribed ratio. Thus, if the jitter value worsens, so that the minimum jitter value becomes large, the jitter threshold value is also set as a large value. In the inverse case, if the jitter value becomes good, the minimum jitter value becomes small, and the jitter threshold value is also set so as to be a small value.

DETAILED DESCRIPTION OF THE PREFERRED EMBODIMENTS

Preferred embodiments of the present invention are described in detail below, with references made to relevant accompanying drawings.

General Configuration of the Optical Disc

Figure 3:
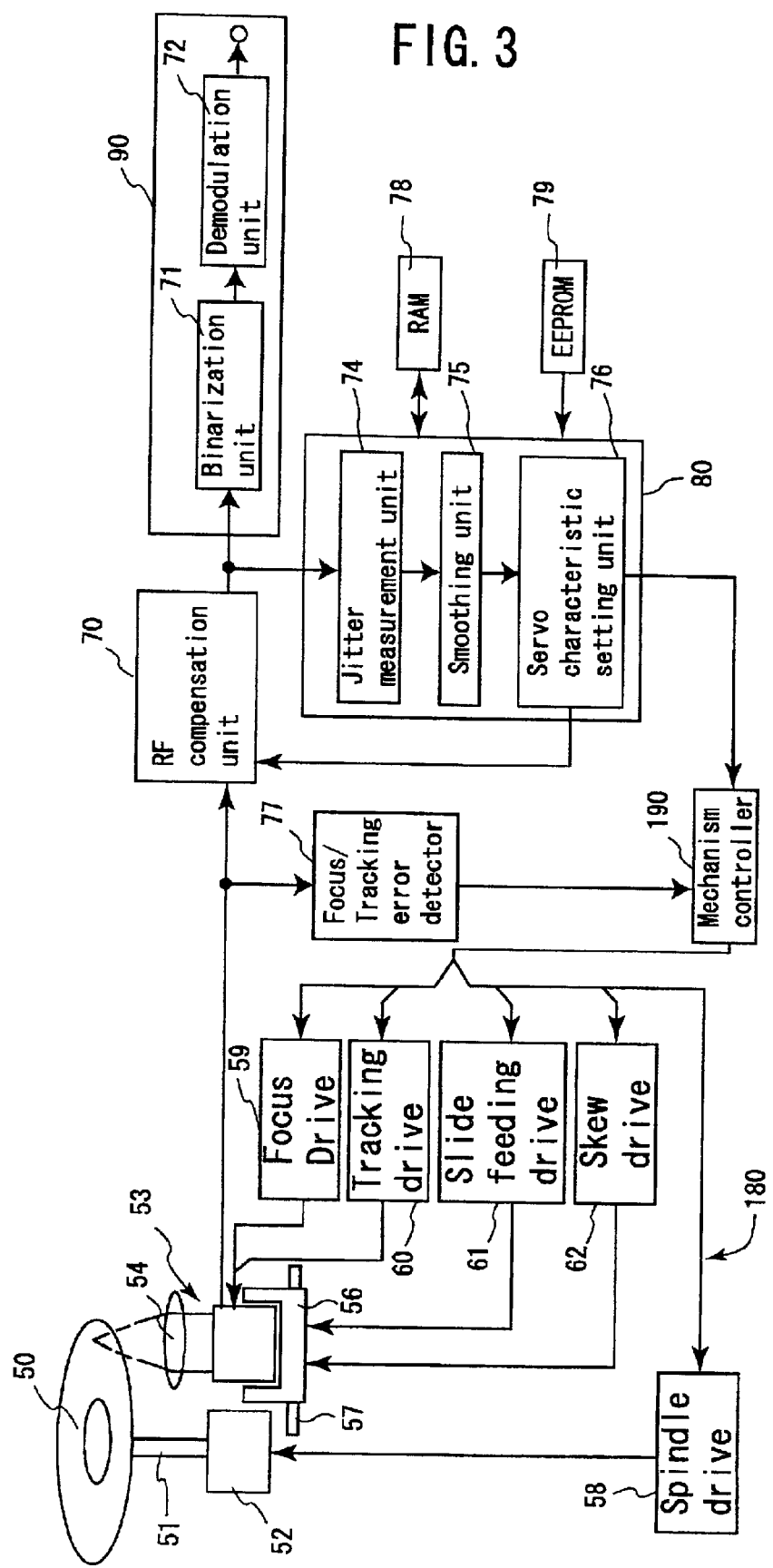
FIG. 3 is a block diagram showing the general configuration of an optical disc apparatus according to an embodiment of the present invention.

FIG. 3 shows the general configuration of an optical disc apparatus according to an embodiment in which the present invention is applied.

In FIG. 3, an optical disc 50 is chucked by a chucking member (not shown in the drawing) provided on an end of a rotating shaft 51 of a spindle motor 52, and is rotationally driven by the spindle motor 52.

An optical pickup 53 is made up of a laser light source, such as a laser diode, a system of optics, which collects and shines the laser light of the laser light source onto the recording surface of the optical disc 50 and which also guides light reflected from the recording surface to a light-receiving surface, an photo-electric conversion element such as a photodetector, having the light-receiving surface of a prescribed pattern and which converts a variable intensity of the reflected light guided thereto by the optics system to a voltage of level commensurate thereto, and a two-axis actuator (not shown in the drawing), which causes an objective lens 54 included in the optics system to move in directions parallel to and perpendicular to a recording surface of the optical disc 50.

Provided together with the optical pickup 53 are a slide feeding mechanism 57, which causes the optical pickup 53 to move in a radial direction with respect to the optical disc 50, and a skew adjustment mechanism 56, which adjusts the angle of the optical pickup 53 so that the laser beam emitted by the optical pickup 53 is perpendicularly incident to the recording surface of the optical disc 50. The slide feeding mechanism 57 is made up of, for example, a threaded mechanism made up of a rack extending in a radial direction with respect to the optical disc 50 and a gear that meshes with the rack, and a stepping motor or the like which causes the gear to rotate, this feeding mechanism being known and, therefore, not described in detail herein, the optical pickup 53 being provided on top of the above-noted rack. In the same manner, although detailed configurational description and drawings thereof are not provided, the above-noted skew adjustment mechanism 56 is made up by a skew angle changing mechanism, which causes the angle of the optical pickup 53 with respect to the optical disc 50 to change within a range from a reference position to a maximum feed position, above-described a stepping motor or the like serving as a source of drive for the skew angle changing mechanism.

An output signal of the optical pickup 53 is input to a focus/tracking error signal detector block 77 and an RF compensation block 70. The RF compensation block 70 compensates the input signal level and frequency characteristics of the input signal from the optical pickup 53. That is, because the signal output from the optical pickup 53, affected by an MTF (modulation transfer function), does not exhibit a flat signal frequency characteristic, and because the level of this signal is not proper for subsequent-stage signal processing, it is necessary to perform this compensation, and the compensation block 70 performs this compensation. The compensation block 70 performs various compensation items, one item that will be discussed in connection with this embodiment of the present invention is that of boost compensation. Boost compensation is compensation so that amplification is done to bring the RF signal from the optical pickup 53 to a level that can be processed by the subsequent signal processing block 90. Details of this boost compensation are provided below. In an optical disc playback system such as in this embodiment, when the optical system of the optical pickup 53 reads the changes in reflectivity of the recording surface of the optical disc 50 (the changes in reflectivity in accordance to the existence or absence of signal pits), the degree of change in reflectivity with respect to a spatial position change is referred to as spatial frequency, and the size of the output signal from the optical pickup 53 changes in accordance with the spatial frequency. The MTF is this function expressed as an equation, and in general the higher is the spatial frequency, the smaller is the output signal, the output signal being zero at above a certain spatial frequency.

The output signal of the RF compensation block 70 is input to the signal processing block 90, and is also input to a servo constant adjustment block 80 for the purpose of automatically adjusting a servo constant that establishes a servo characteristic in this embodiment. Details of the configuration and operation of this servo constant adjustment block 80 are provided below.

At the signal processing block 90 a signal from the RF compensation block is binarized by a binarization section 71, and a demodular 72 performs signal demodulation processing corresponding to the signal modulation processing performed when recording was done onto the optical disc 50. Although it is not shown in the drawing, the demodulated signal is then subjected to error correction processing and decoding processing.

A focus/tracking error signal detection block 77 detects a focus error signal caused, for example, by so-called astigmatism or the like from the output of the optical pickup 53, and detects a tracking error signal using, for example, the so-called push-pull method. These focus and tracking error signals are sent to a mechanism controller 190.

The mechanism controller 190 controls a drive block 180, and performs control of the above-described servos for focusing, tracking, slide feeding, and skew of the optical pickup 53, and control of the rotating servo for the spindle motor 52 used for optical disc rotational drive. That is, the mechanism controller 190, based on the above-noted focus error signal and tracking error signal, performs control of a focus bias and tracking bias values that are output by a focus drive IC 59 and a tracking drive IC 60, causing a two-axis actuator of the above-noted optical pickup 53 to be driven, so as to adjust the focal point of the objective lens 54 on the recording surface of the optical disc 50, and so as to adjust the laser spot onto a desired track. The mechanism controller 190 controls a spindle motor drive signal output by a spindle drive IC 58, so as to rotationally drive the spindle motor 52 for rotationally driving the optical disc 50, thereby achieving either a fixed or a variable rotational speed for the optical disc 50. The mechanism controller 190 also controls a slide feeding drive IC 61 of the drive block 180, so that the stepping motor of the threaded mechanism is driven to rotate a gear, thereby causing the optical pickup 53 to move along a radial direction with respect to the optical disc 50. The mechanism controller 190 additionally controls the a skew drive IC 62 of the drive block 180, so as to drive a stepping motor of the skew angle adjustment mechanism, thereby establishing the positioning of the optical pickup 53 opposing the recording surface of the optical disc 50 so that it is at the center position. This center position is the center operating position set using a reference disc when the optical disc apparatus is manufactured.

Configuration and Operation of the Servo Constant Adjustment Block

The chief constituent elements of the servo constant adjustment block 80 are a jitter measurement section 74, which measures the jitter from the output signal of the RF compensation block 70 as described later, a smoothing processing section 75, which smoothes the measured jitter as described later, and a servo characteristics setting section 76, which, from the above-noted smoothed jitter, sets a constant that establishes a servo characteristic. The servo constants set by the servo characteristics setting section 76 is a constant that, for example, establishes various servo characteristics, such as focus, tracking, skew, and RF signal boost compensation, and each of theses servo characteristics constants is sent to the corresponding RF compensation section 70 or the mechanism controller 190.

Specifically, a constant that establishes the RF signal boost compensation is sent from the above-noted servo characteristic setting section 76 to the RF compensation section 70, at which the RF signal boost compensation is performed in accordance with that constant. In a similar manner, constants which establish servo characteristics such as skew and focus bias are set to the mechanism controller 190, at which the skew and focus bias control signals are generated in accordance with these constant values.

As described above, the constants adjusted in the servo constant adjustment block 80 are constants that establish various servo characteristics, such as skew, focus bias, and RF signal boost compensation and the like, and in the following description of an embodiment, the constant for the RF signal boost compensation (hereinafter referred to as the boost value) is taken as being exemplary of these constants for the purpose of the description.

Relationship Between the Boost Value, the Jitter Value, and the Error Rate

The general relationship between the jitter value (curve LJ in FIG. 4) for a boost value for compensation (amplification)

of the RF signal level, and the data error rate (curve LE in FIG. 4) is described below, with reference to FIG. 4.

The lower then jitter or the error rate the better, and it is known that in general the jitter value or error rate is minimum for a certain boost value.

In an optical disc apparatus according to this embodiment of the present invention, it can be envisioned that the best signal characteristics are obtained when the error rate is the best. However, at a boost value that yields the best error rate, the jitter value is not necessarily the best. That is, as shown in FIG. 4, the boost value BTj corresponding to the point Pjb, at which jitter value is minimum on the jitter curve LJ is not necessarily the same as the boost value BTe corresponding to the point Peb at which the error rate is minimum on the error rate curve LE.

Because of the configuration of the optical disc apparatus, while the jitter rate can be measured, it is not possible to measure the error rate.

Given the above situation, in order to determine an optimum boost compensation constant for the RF signal, one approach that can be envisioned is that of measuring the jitter value for each of a number of boost values and determining the relationship of the measured jitter values to the boost value, based on an experimentally obtained relationship between the jitter value and the error rate, predicting the boost value at which the error rate is best, and setting the boost value obtained from this prediction as the optimum constant for boost compensation.

In this embodiment in particular, as a method of determining the optimum constant for the RF signal boost compensation, a determination is made of the minimum jitter value each time the optical disc is mounted or each time playback or the like is performed of the optical disc 50, and a value obtained by multiplying that minimum jitter value by a prescribed ratio $\beta$ is determined as the jitter threshold value J$\beta$th, of the jitter values corresponding to each of the boost values at prescribed steps a first boost value (first variable value) and a second boost value (second variable value) corresponding to first and second jitter values exceeding the jitter threshold value J$\beta$th are determined, and a boost value at which it is thought that the error rate is minimum is set, based on the first boost value and the second boost value. The above-noted prescribed ratio $\beta$ is a ratio pre-determined for each servo adjustment item, and specific values thereof are described below.

Figure 1:
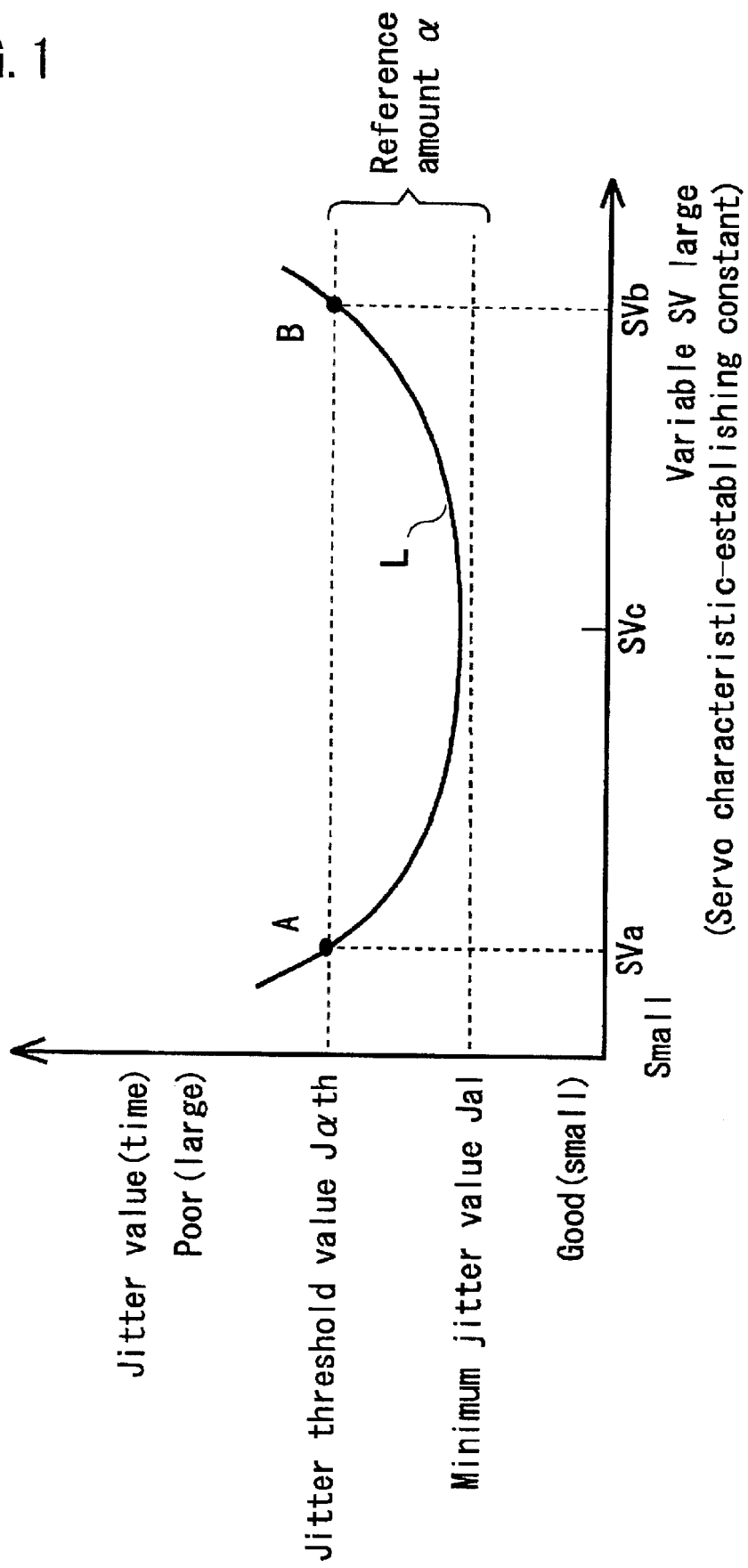
FIG. 1 is a drawing illustrating a method for automatic adjustment in an optical disc apparatus of the past.
Figure 2:
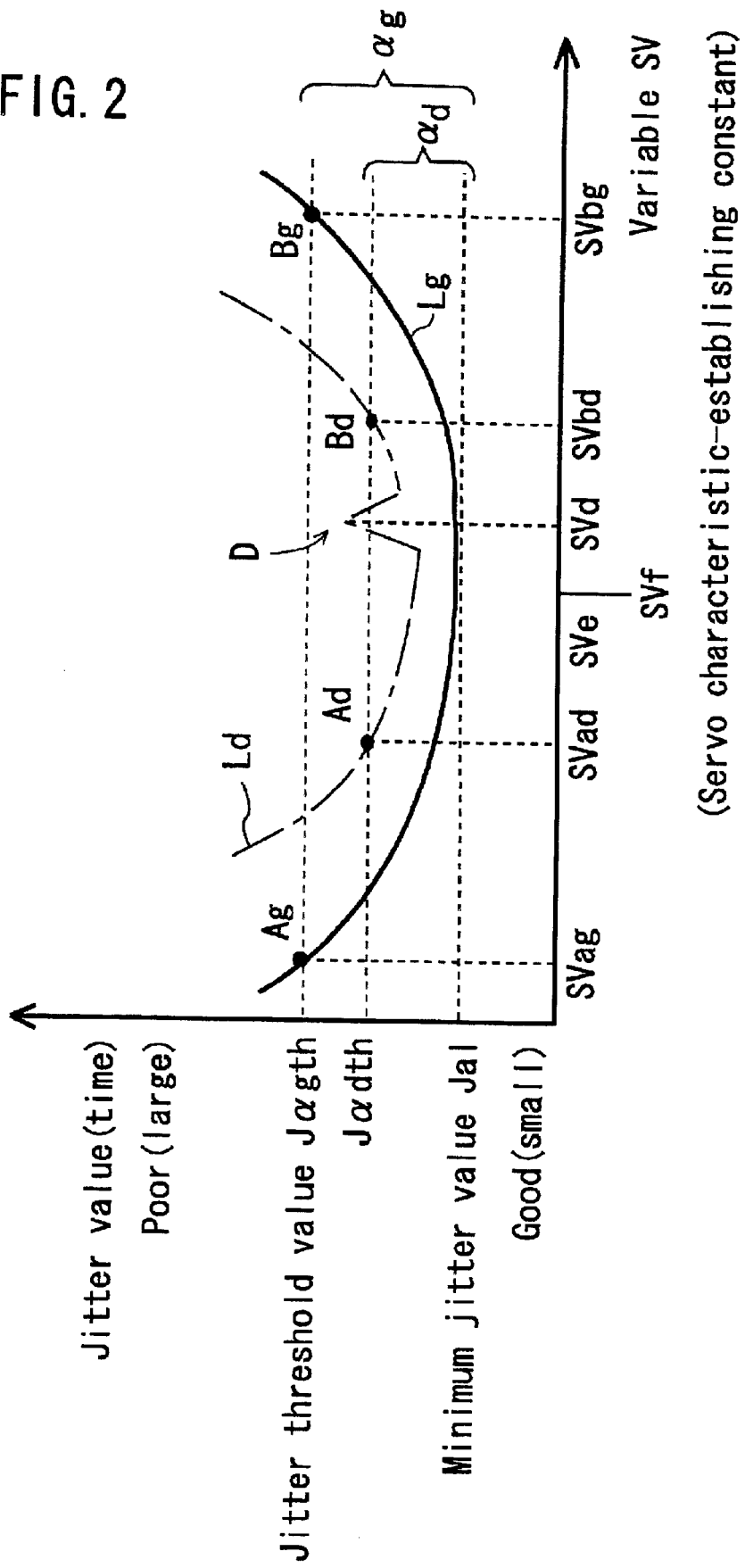
FIG. 2 is a drawing illustrating a problem in an automatic adjustment method in an optical disc apparatus of the past.

More specifically, according to this embodiment, rather than using a jitter threshold value J$\alpha$th obtained by adding a fixed reference amount $\alpha$ to a minimum jitter value Jal obtained by past measurements, such as described with reference to FIG. 1, as described above the a jitter value obtained by multiplying a minimum jitter value measured for each mounting or playback of the optical disc 50 by a prescribed ratio $\beta$ is used as the jitter threshold value J$\beta$th. That is, in the case of this embodiment, the minimum jitter value is a variable value, and as a result the jitter threshold value, which is obtained by multiplying this minimum jitter value by a prescribed ratio $\beta$, is also a variable value. Thus, if for example the jitter value worsens and the minimum jitter value becomes large, the jitter threshold value is also set as a large value, so that as described with regard to FIG. 2 even if the jitter worsens and a suddenly occurring variation D occurs, there is no erroneous detection occurring caused by that variation D, and as a result there is no erroneous setting of the boost value optimum value. In the reverse situation, if the jitter improves and the minimum jitter value becomes small, the above-noted jitter threshold value J$\beta$th also is set so as to be a small value, so that, as described with regard to FIG. 2, even in the case in which the jitter improves, it is possible to reduce the time required to set the optimum boost value.

It can also be envisioned that a prescribe value a be added to the minimum jitter value obtained by measurement as in this embodiment, and this be set as the jitter threshold value. In the case in which a prescribed value $\alpha$ is added to the minimum jitter value obtained by measurement, however, compared to the case such as this embodiment, in which the minimum jitter value is multiplied by a prescribed ratio $\beta$, the amount of change in the jitter threshold value with respect to a change in the minimum jitter value is small. For this reason, by merely adding a prescribed value to the minimum jitter value as noted above, there is a risk when the jitter value worsens, for example, that an erroneous setting will be made of the optimum boost value, and in the reverse case, in which the jitter value improves, there is the risk that it is not possible to shorten the amount of time required to set the optimum boost value. In contrast to this, according to this present invention of the present invention, by multiplying the minimum jitter value by a prescribed ratio $\beta$ to set the jitter threshold value, because the amount of change of the jitter threshold value with respect to the amount of change of the minimum jitter value becomes large, erroneous setting of the optimum boost value is eliminated when the jitter value becomes poor, and it is still possible to shorten the amount of time required to set the optimum boost value when the jitter value is improved.

Boost Adjustment Procedure

A specific procedure in the above-noted boost constant adjustment block 80 of an optical disc apparatus according to this embodiment of the present invention for measuring the jitter from the RF signal, and for setting a constant (boost value) for obtaining the best boost compensation based on that jitter value is described below.

Figure 5:
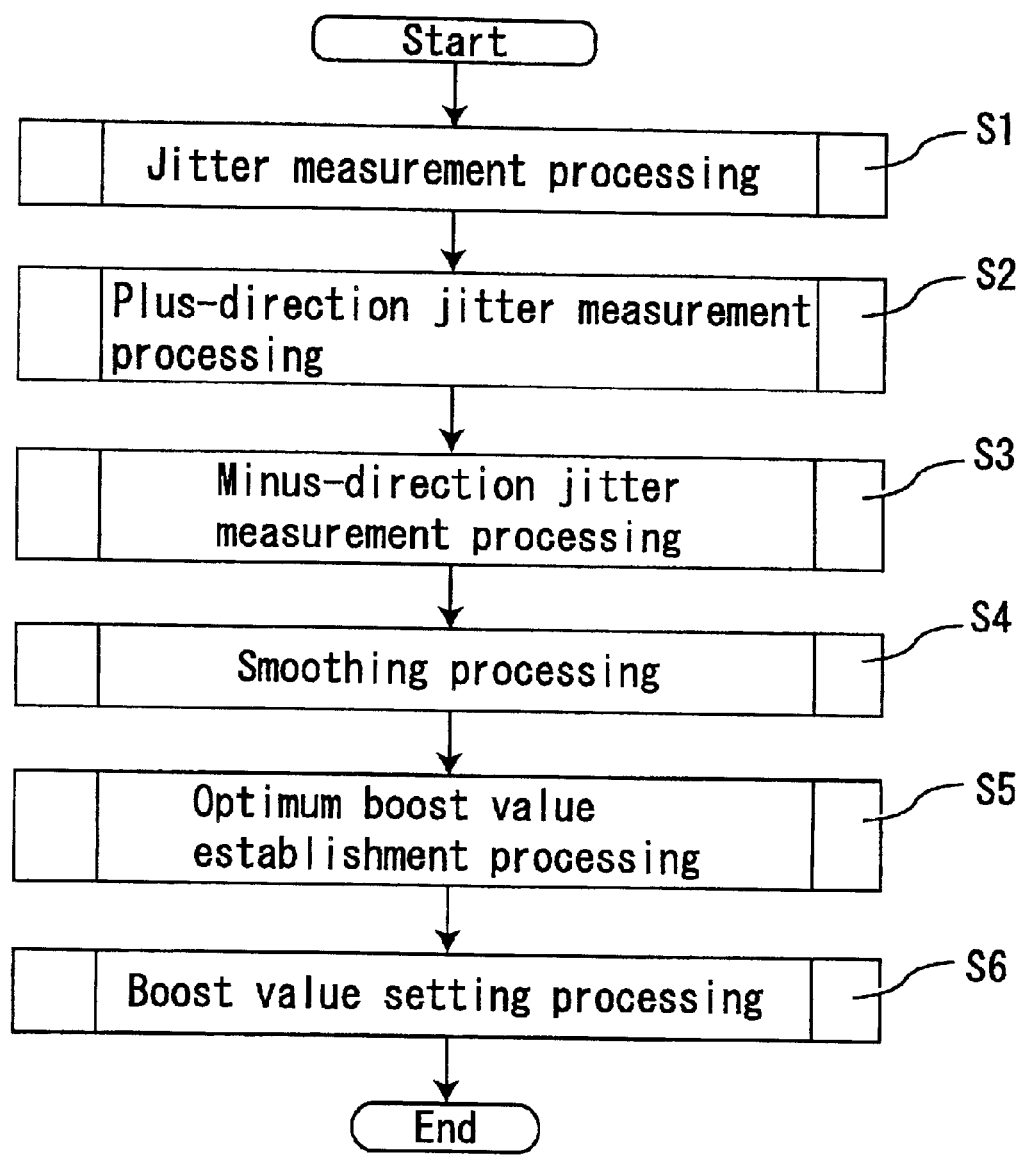
FIG. 5 is a flowchart showing the general flow of a boost value adjustment procedure in an optical disc apparatus according to an embodiment of the present invention.

FIG. 5 shows the general flow of processing in the procedure for adjusting the boost value in an optical disc apparatus according to this embodiment of the present invention.

In FIG. 5 at the jitter measurement block 74 of the servo constant adjustment block 80, jitter measurement processing is first performed at step S1, and a setting such as the setting of the cutoff frequency or other initial value is made in response to the initial structure of the recording layer of the optical disc 50. When the jitter measurement processing is performed at step S1, boost value initialization is also performed of the boost value of the RF compensation block 70. Details of the jitter measurement performed at step S1 are described later, with reference being made to FIG. 4.

Next, with step S2 being a step for plus-direction jitter measurement processing, at the servo characteristics setting section 76 the boost value is stepwise increased by a prescribed step from a pre-established center boost value in the plus direction (direction of increasing the boost value), and at the jitter measurement section 74 the jitter values corresponding to each value of boost are measured, as the minimum jitter value is updated and the jitter threshold value is set, each jitter value, minimum jitter value, and jitter threshold value being stored into a RAM area for jitter measurement in the RAM 78. Details of the plus-direction jitter measurement processing at step S2 are described later, with references made to FIG. 7 and FIG. 8.

When the above-described plus-direction jitter measurement processing is completed, with step S3 as a step for minus-direction jitter measurement processing, at the servo characteristics setting section 76 the boost value is stepwise decreased by a prescribed step from a pre-established center boost value in the minus direction (direction of increasing the boost value), and at the jitter measurement section 74 the jitter values corresponding to each value of boost are measured, as the minimum jitter value is updated and the jitter threshold value is set, each jitter value, minimum jitter value, and jitter threshold value being stored into the RAM area for jitter measurement. Details of the minus-direction jitter measurement processing at step S3 are described later, with references made to FIG. 9 and FIG. 10.

Next, at step S4, which performs smoothing processing, the jitter values measured at the above steps by the jitter measurement section 74 are sent to the smoothing processing section 75, at which smoothing processing is performed so as to remove dispersion among the jitter values. Although this smoothing processing is not absolutely required, by performing smoothing processing it is possible to reduce the dispersion in jitter values. Details of the smoothing processing at step S4 are described later, with reference made to FIG. 9 and FIG. 10.

When the above-noted smoothing processing is completed, processing proceeds to step S5, at which processing is performed to establish an optimum boost value. At the servo characteristics setting section 76, the jitter values stored in the jitter measurement RAM and boost values corresponding to these jitter values are used to determine the optimum boost value, at which the error rate is minimum, at step S6, which performs boost value setting, the above-noted optimum boost value is set as a constant value for boost compensation in the RF compensation section 70. Details of the optimum boost value establishing processing at step S5 are described below with reference made to FIG. 13 and FIG. 14, and details of the boost value setting processing at step S6 are described below with reference made to FIG. 15.

Jitter Measurement Pre-Processing Flow

Figure 6:
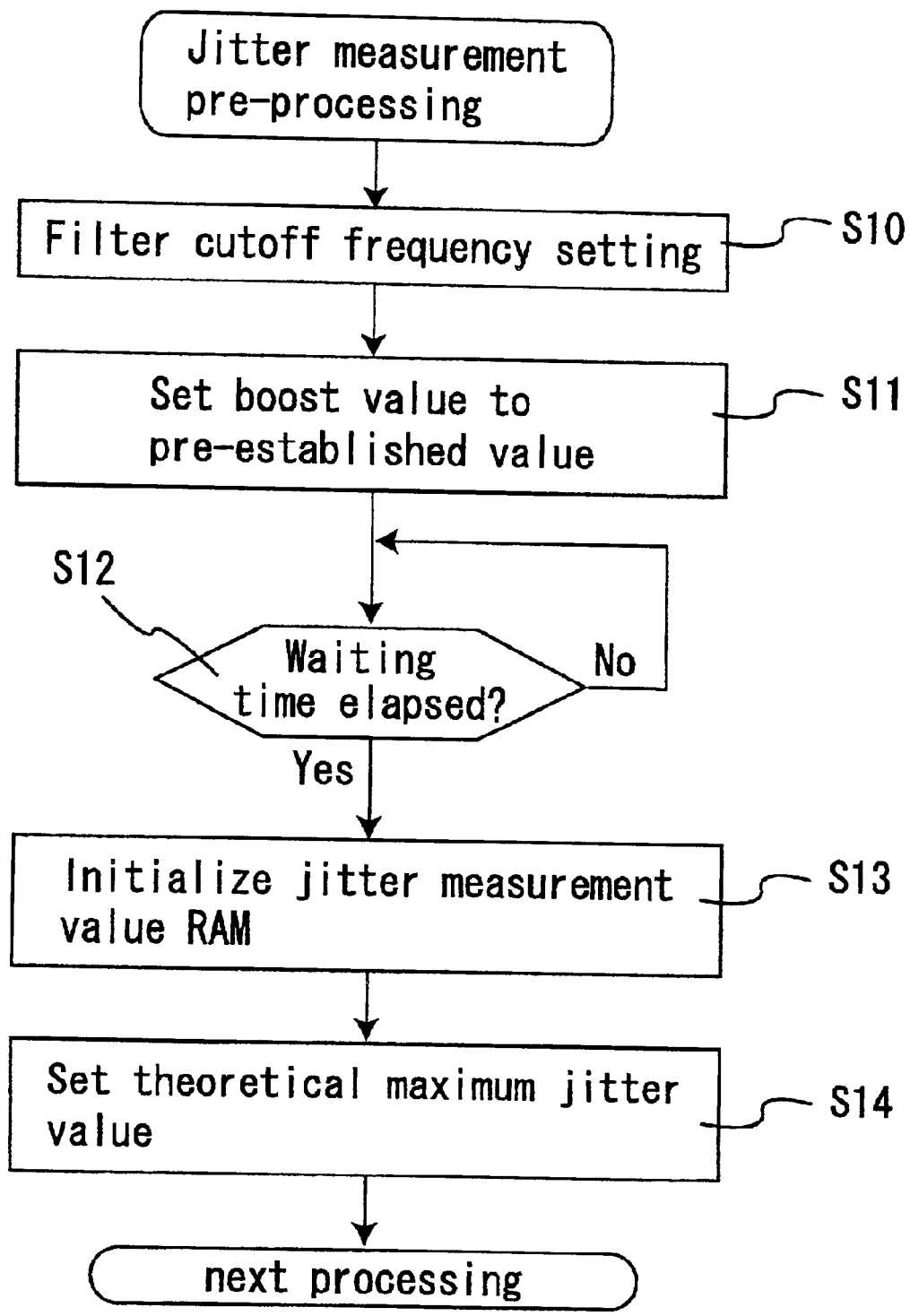
FIG. 6 is a flowchart showing the detailed flow of jitter measurement pre-processing in a boost value adjustment procedure according to an embodiment of the present invention.

Referring to FIG. 6, the flow of jitter measurement pre-processing at step S5 of FIG. 5 is as follows.

When the jitter measurement pre-processing starts, first as the processing performed at step S10, depending upon whether the jitter measurement section 74 is to perform a jitter measurement for the case in which the optical disc 50 mounted in the optical disc apparatus is a single-layer disc, or in the case in which the optical disc 50 is a dual-layer disc having two recording surfaces is to either perform a jitter measurement with regard to the first layer recording surface or a jitter measurement with regard to the second layer recording surface, a setting is made of the cutoff frequency of a filter for the purpose of extracting a signal component from the above-noted RF signal.

As the processing of step S11, the servo characteristics setting section 76 initializes the boost value at the RF compensation block 70 to, for example, a center boost value that has been stored in an EEPROM 79 or the like beforehand.

Next, as the processing of step S12 the jitter measurement section 74 waits a prescribed amount of waiting time (for example, 10 milliseconds), after which at step S13 the jitter measurement RAM area provided within the RAM 78 is initialized (to 0xffffh, where the suffixed h indicates hexadecimal notation).

Additionally, as the processing of step S14 the jitter measurement section 74 sets the minimum jitter value as the theoretical maximum value as an initial value.

After the processing of step S14, the flow of processing proceeds to step S2 of FIG. 5.

Flow of Plus-Direction Jitter Measurement Processing

The flow of plus-direction jitter measurement processing at step S2 of FIG. 5 is described below, with reference made to FIG. 7.

When the jitter measurement pre-processing described above is completed, the processing flow proceeds to plus-direction jitter measurement processing, at which point as the processing of step S20 the servo characteristics setting section 76 first causes the boost value to be stepwise increased by a prescribed step in the plus direction (direction that increases the boost value) from the initialized center boost value set at step S11 of FIG. 6. Simultaneously with this, as the processing of step S21 at the jitter measurement section 74 measures jitter values corresponding to each boost value set at prescribed steps, and the measurement jitter values are stored into a RAM area for measured jitter values. Details of the jitter measurement processing at step S20 are described later, with reference made to FIG. 7 and FIG. 8.

When the above is done, as the processing of step S22, the jitter measurement section 74 makes a judgment as to whether or not jitter values measured at each step of boost value are smaller than the minimum previous measured jitter value, and if the judgment result is "yes", as the processing of step S23 the measured jitter value is used to update the minimum jitter value, but if the judgment result is "no", the flow of processing proceeds to the plus-direction jitter measurement end-judgment processing at step S24 and thereafter.

When the processing proceeds to step S24, the servo characteristics setting section 76 makes a judgment whether or not the current boost value has reached a pre-determined value for the plus-direction boost value (for example, the maximum value at which boost compensation is possible). If the judgment is that this pre-determined value has not been reached, processing flow proceeds to step S25, and if the judgment is made that the pre-determined value has been reached, after returning the boost value to the center boost value at step S27, the processing flow proceeds to the minus-direction jitter measurement processing.

When the processing flow proceeds from step S24 to step S25, the jitter measurement section 74 uses a jitter threshold value Jβth determined by multiplying the jitter value determined as described above by a prescribed ratio β and makes a judgment as to whether or not the above measured jitter value exceeds this jitter threshold value three times in a row. If the judgment is that it has not exceeded the jitter threshold Jβth value three times in a row, the processing flow proceeds to step S26. If the judgment is made, however, that the jitter value exceeded the jitter threshold value Jβth three times in a row, the jitter measurement is stopped at step S27, and the flow of processing proceeds to the minus-direction jitter measurement processing. Details of the jitter measurement end judgment processing using the jitter threshold value Jβth at step S25 are described later, with reference made to FIG. 8.

When the flow of processing proceeds from step S25 to step S26, the servo characteristics setting section 76 causes an increase of one prescribed step only in the boost value, after which return is made to the processing of step S20, from which point the plus-direction jitter measurement processing is repeated.

Flow of Minus-Direction Jitter Measurement Processing

Figure 8:
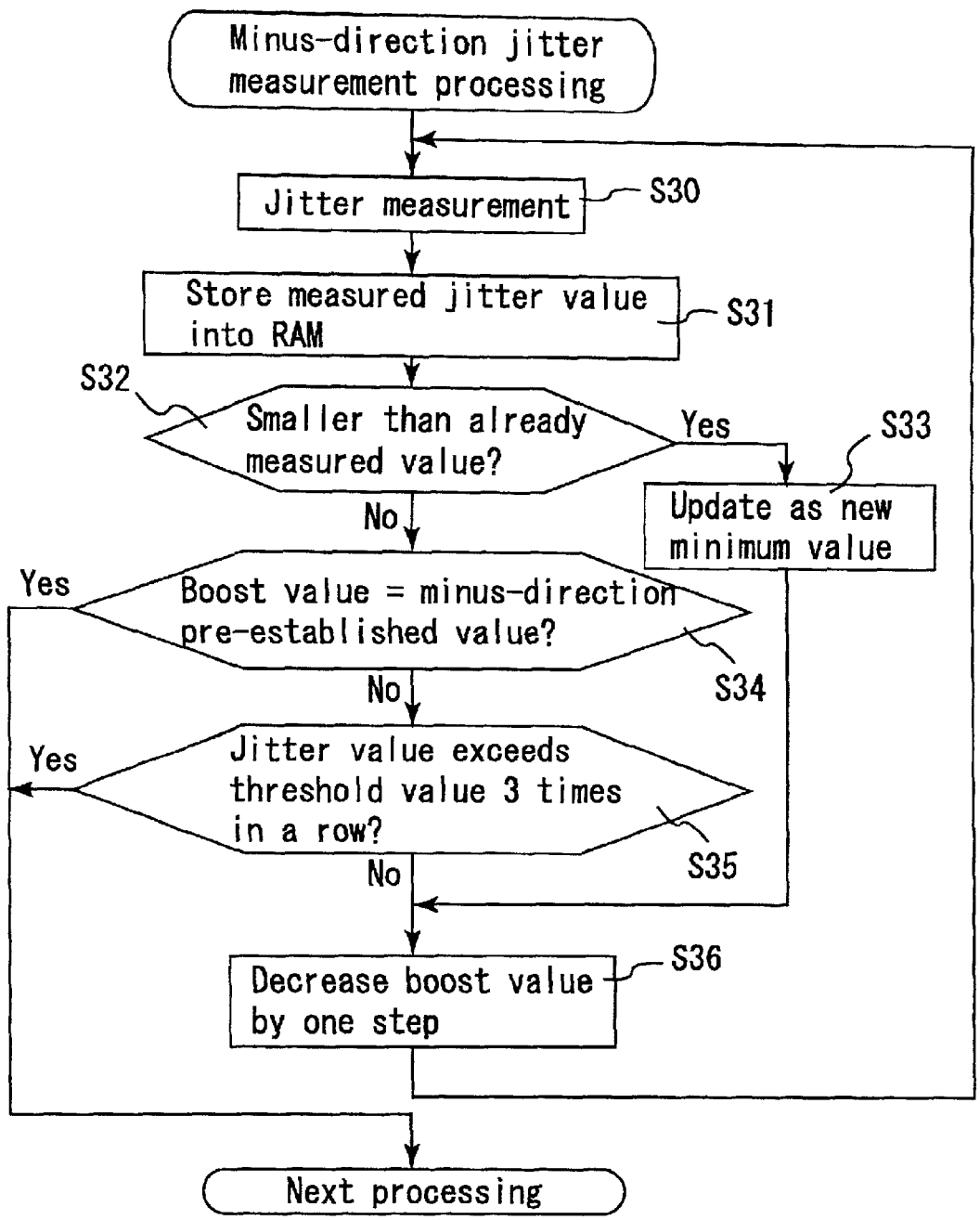
FIG. 8 is a flowchart showing the detailed flow in a minus-direction jitter measurement processing in a boost value adjustment procedure according to an embodiment of the present invention.

The flow of minus-direction jitter measurement processing at step S3 of FIG. 5 is described below, with reference made to FIG. 8.

Figure 7:
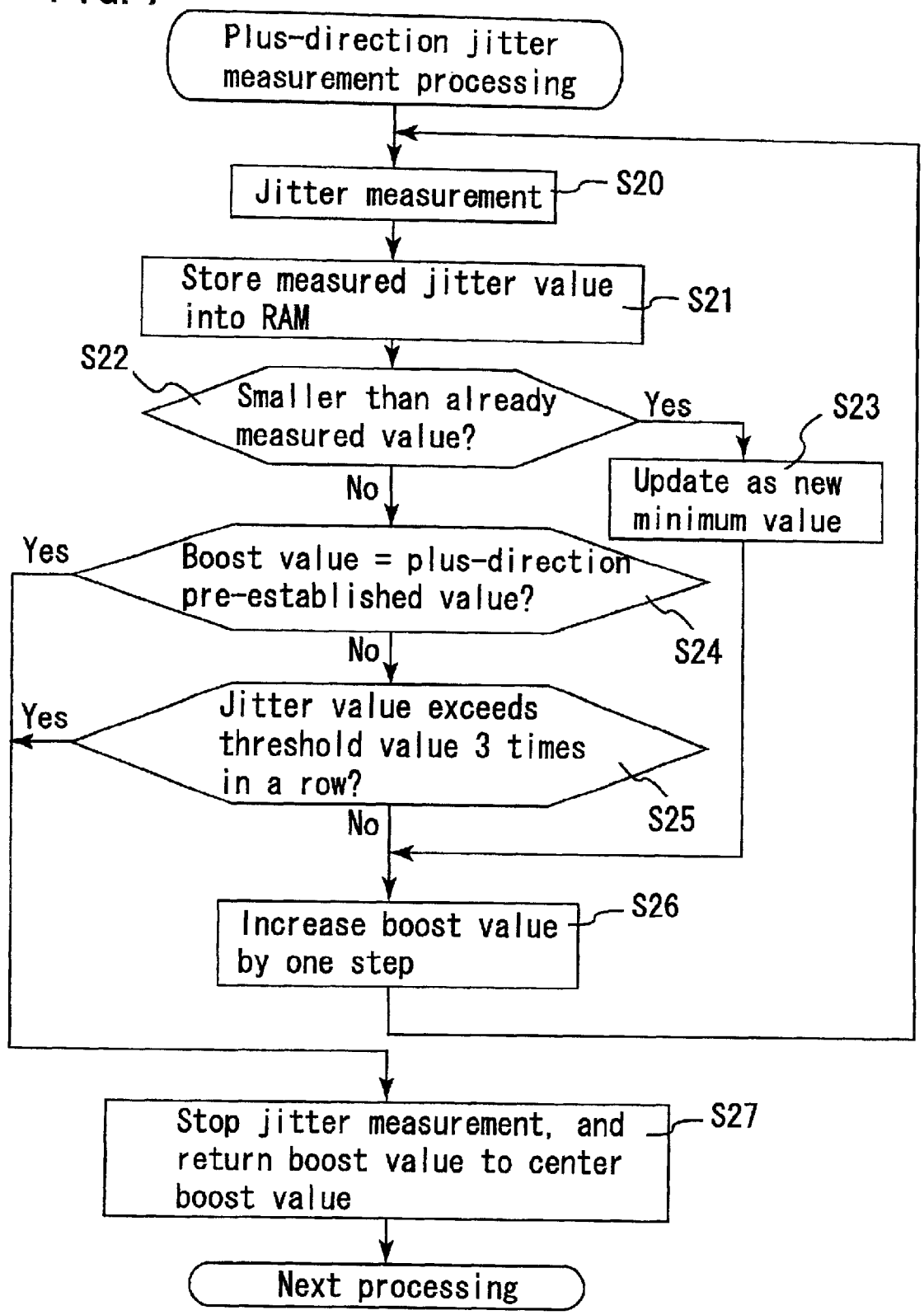
FIG. 7 is a flowchart showing the detailed flow of plus-direction jitter measurement processing in a boost value adjustment procedure according to an embodiment of the present invention.

When the jitter measurement pre-processing described above is completed, the processing flow proceeds to minus-direction jitter measurement processing, at which point as the processing of step S30 the servo characteristics setting section 76 first causes the boost value to be stepwise decreased by a prescribed step in the minus direction (direction that decreases the boost value) from the initialized center boost value returned to at step S27 of FIG. 7. Simultaneously with this, as the processing of step S31 at the jitter measurement section 74 measures jitter values corresponding to each boost value set at prescribed steps, and the measurement jitter values are stored into a RAM area for measured jitter values. Details of the jitter measurement processing at step S30 are described later, with reference made to FIG. 9 and FIG. 10.

When the above is done, as the processing of step S32, the jitter measurement section 74 makes a judgment as to whether or not jitter values measured at each step of boost value are smaller than the minimum previous measured jitter value, and if the judgment result is "yes", as the processing of step S33 the measured jitter value is used to update the minimum jitter value, but if the judgment result is "no", the flow of processing proceeds to the plus-direction jitter measurement end-judgment processing at step S34 and thereafter.

When the processing proceeds to step S34, the servo characteristics setting section 76 makes a judgment whether or not the current boost value has reached a pre-determined value for the minus-direction boost value (for example, the minimum value at which boost compensation is possible). If the judgment is that this pre-determined value has not been reached, processing flow proceeds to step S35, and if the judgment is made that the pre-determined value has been reached, the flow of processing proceeds to the smoothing processing of step S24 in FIG. 5, which is the next processing to be performed.

When the flow of processing proceeds from step S34 to step S35, the jitter measurement section 74 uses a jitter threshold value Jβth determined by multiplying the jitter value determined as described above by a prescribed ratio β and makes a judgment as to whether or not the above measured jitter value exceeds this jitter threshold value three times in a row. If the judgment is that it has not exceeded the jitter threshold Jβth value three times in a row, the processing flow proceeds to step S36. If the judgment is made, however, that the jitter value exceeded the jitter threshold value Jβth three times in a row, the flow of processing proceeds to the smoothing processing of step S4 of FIG. 3, which is the next processing to be performed. Details of the jitter measurement end judgment processing using the jitter threshold value Jβth at step S35 are described later, with reference made to FIG. 10.

When the flow of processing proceeds from step S35 to step S36, the servo characteristics setting section 76 causes a reduction in the boost value by just one prescribed step, the flow of processing returning then to step S30, from which minus-direction jitter measurement processing is repeated.

Specific Examples of Jitter Measurement

Specific examples of jitter measurement as performed at step S20 and step S30, for plus-direction and minus-direction jitter measurement processing, respectively, are described below.

In this embodiment, a jitter measurement for a single boost value is performed as follows, under the assumption of normal-speed playback from the innermost circumference of the optical disc 50. In the case of an optical disc 50 that is a single-layer disc DVD, the innermost disc radius is 24 mm, and for normal-speed playback the linear speed is 49 mm/s, the time required for one rotation of the disc being 43.2 s.

Figure 9:
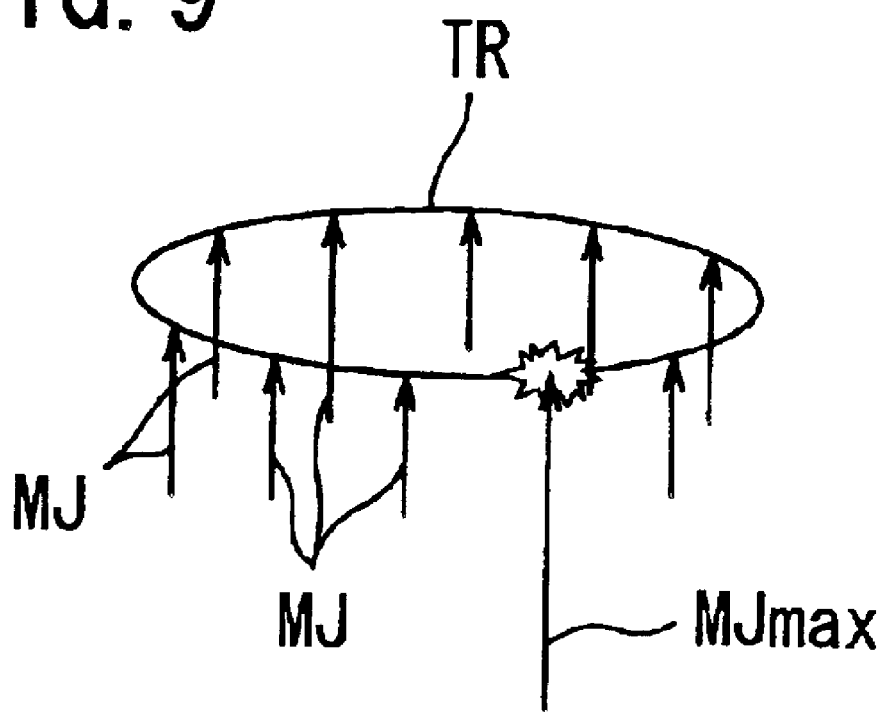
FIG. 9 is a drawing illustrating a specific example of jitter measurement performed during plus-direction jitter measurement processing and during minus-direction jitter measurement processing.

In this embodiment, as shown in FIG. 9, for each revolution of a track TR which is the innermost circumference of the disc, 10 jitter measurements are performed with one and the same boost value, this being measurement of 10 jitter values MJ for one and the same boost value at a time interval of 4 ms during one revolution of the disc. The arrow directions MJ for the jitter values shown in FIG. 9 indicate the jitter measurement points, and the lengths of the arrows indicate the size of the jitter values.

Additionally, in this embodiment of the 10 values of jitter MJ obtained over one revolution of the disc, the total of the 9 jitter values remaining after the maximum jitter value MJmax is eliminated is taken as the jitter value for that particular boost value. The reason that the maximum value is eliminated is that there are cases in which a flaw, for example, exits on the surface of the optical disc, this causing an anomalous extreme worsening of the jitter, and the elimination of the maximum jitter value is done to eliminate the influence of such changes in the jitter value caused by external disturbances.

Jitter Measurement End Judgment Processing

A specific example of jitter measurement end judgment processing using a jitter threshold value Jβth at step S35 of the plus-direction and minus-direction jitter measurement processing is described below is given below.

In this embodiment, in making a jitter measurement end judgment when performing plus-direction and minus-direction jitter measurement, as described above in the case in which the measured jitter value exceeds the jitter threshold value Jβth three times in a row, the processing to measure jitter is ended.

Figure 10:
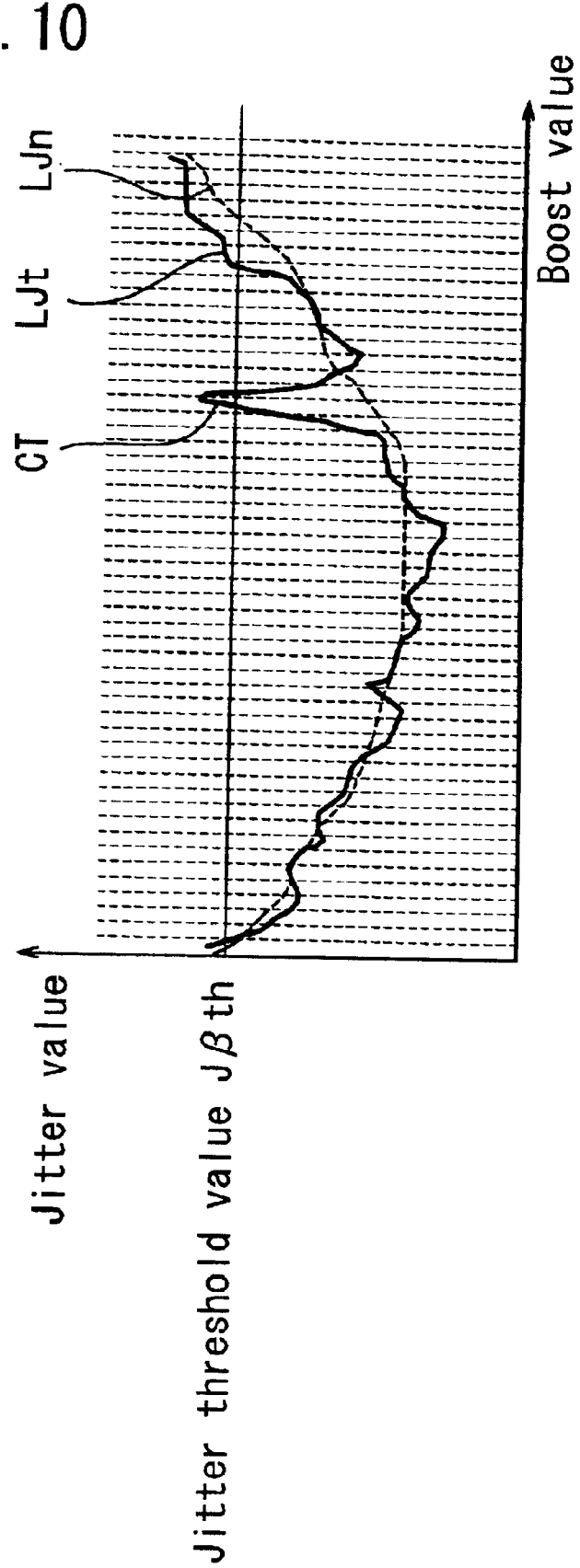
FIG. 10 is a drawing illustrating jitter measurement end-judgment processing performed during plus-direction jitter measurement processing and during minus-direction jitter measurement processing.

While in general it can be envisioned that as the distance from the optimum boost value increases the jitter value also worsens, if the jitter value measurement (increase or decrease of the boost value) is terminated when, for example, a single jitter value exceeds the jitter threshold value Jβth, although there is no problem when the measured jitter value (curve LJn) exhibits almost no external disturbance, as shown in FIG. 10, in the case in which, for example as shown by the curve LJt, there is a sudden worsening of the jitter value because of such phenomena as vibration, a defect in the disc, or electromagnetic noise, a suddenly worsened jitter value (the part indicated as CT in the drawing) will be measured, and measurement will be terminated in this type of case as well. Thus, if the jitter measurement of a suddenly worsened jitter value such as shown at CT in the drawing is terminated, when a subsequent determination is made of the optimum boost value, there is a risk that an erroneous setting will be made of the optimum boost value.

Given the above-noted situation, in order to prevent such suddenly worsened jitter values from influencing the proper termination of the jitter measurement, the jitter measurement (increasing and decreasing of the boost value) is terminated only when the measured jitter value exceeds the jitter threshold value three times in a row. Thus, in this embodiment of the present invention, a method is applied to remove chattering in the jitter value with respect to the boost value.

The above-noted jitter threshold value Jβth is determined, as described above, by multiplying a minimum jitter value, obtained by measurement, by a prescribed ratio β. The prescribed ratio β is a value obtained as an integer selected in steps of 10 over the range from 0 to 140, or a value that is 0.5 times the minimum jitter value. These prescribed ratios β are set from values pre-stored into, for example, the EEPROM 79, in response to the servo adjustment item.

Flow of Smoothing Processing

Figure 11:
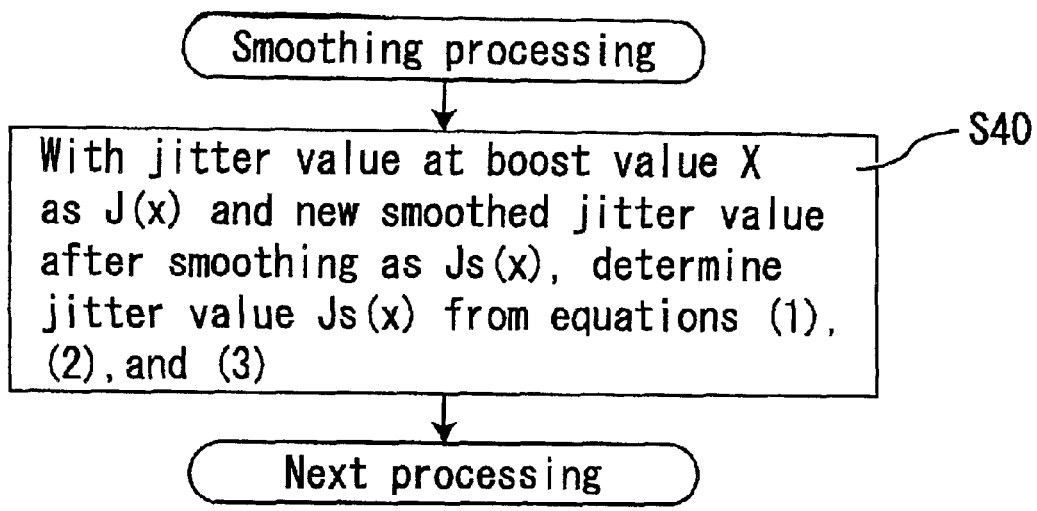
FIG. 11 is a flowchart showing the detailed flow of smoothing processing in the boost value adjustment procedure according to an embodiment of the present invention.

Referring to FIG. 11, the flow of smoothing processing performed at step S4 in FIG. 5 is as described below.

When the plus-direction and minus-direction jitter measurement processing ends and processing flow proceeds to the smoothing processing, the smoothing processing section 75 takes the jitter value at some boost value x (where $0 \leq x \leq xmax$) as J(x), and a new jitter value after smoothing as Js(x), using the Equations (1) to (3) presented below to calculate the new smoothed jitter value Js(x), which is output as the jitter value after smoothing processing.

$$Js(0)=\{3J(0)+J(1)\}/4 \qquad (1)$$

$$Js(x)=\{J(x-1)+2J(x)+J(x+1)\}/4 \qquad (2)$$

$$Js(xmax)=\{J(xmax-1)+3J(xmax)\}/4 \qquad (3)$$

The above Equation (1) is the equation used to determine a new post-smoothing jitter value Js(0) corresponding to a boost value of 0, which is the minimum boost value, Equation (2) is the equation used to determine a new post-smoothing jitter value Js(x) corresponding to a boost value of x, which corresponds to the boost values after eliminating the minimum boost value 0 and the maximum boost value xmax, and Equation (3) is the equation used to determine a new post-smoothing jitter value Js (xmax) corresponding to a boost value of xmax, which is the maximum boost value. The 3J(0) coefficient 3 in Equation (1), the 2J(x) coefficient 2 in Equation (2), and the 3J(xmax) coefficient 3 in Equation (3) are weighting coefficients, the denominator 4 in each case being the number of data.

Figure 12:
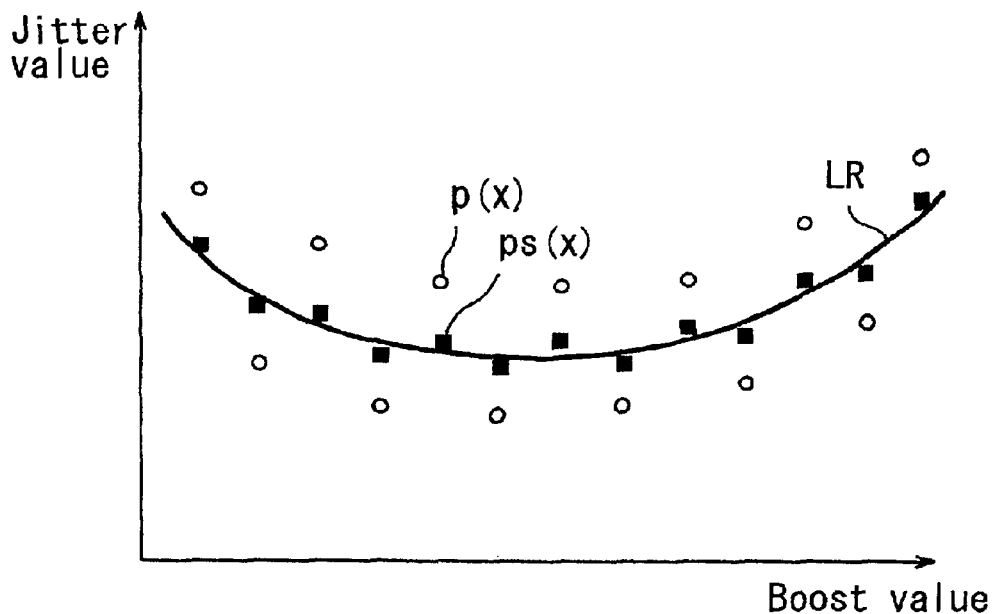
FIG. 12 is a drawing illustrating the change in variation of the jitter value before and after smoothing processing.

FIG. 12 shows the boost value x, plots of plots p(x) of the jitter value J(x) before smoothing, plots ps(x) of the jitter values Js(x) after smoothing, and an approximated curve LR obtained by the method of least squares for each of the plotted data points.

As can be seen from FIG. 12, the pre-smoothing plotted points p(x) exhibit a large amount of jitter value dispersion. In contrast to this, the post-smoothing plotted points ps (x) have only a small dispersion in jitter value.

From the above, it is possible to perform smoothing processing, so as to reduce the influence of jitter value dispersion, so that even if there is external disturbance, it is possible to approach the relationship between boost values and jitter values x that would occur in the case of no such disturbance occurring.

Flow of Optimum Boost Value Establishment Processing

Figure 13:
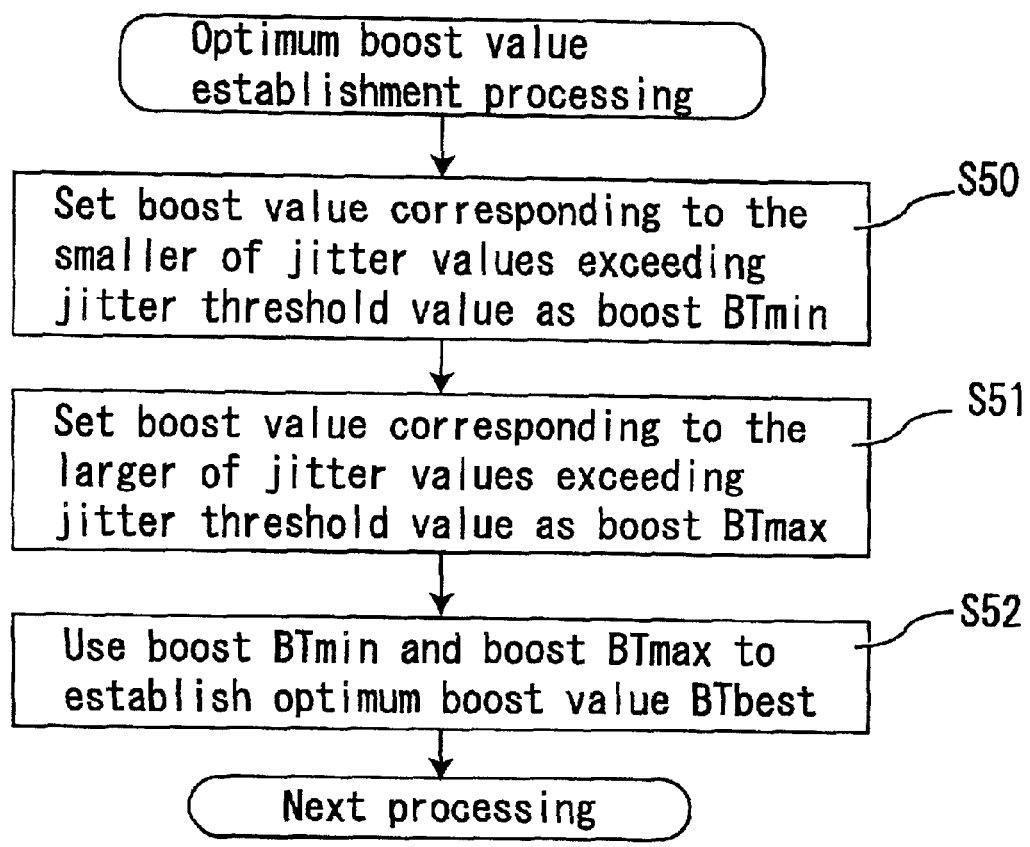
FIG. 13 is a flowchart showing the detailed flow of optimum boost value establishment processing in the boost value adjustment procedure according to an embodiment of the present invention.

The flow of processing performed to establish the optimum boost value in this embodiment of the present invention, whereby, an optimum boost value at which it is thought that the error rate will be minimum is set, based on a first boost value and a second boost value corresponding to a first and a second jitter value that exceed a jitter threshold value jβth is described below, with reference made to FIG. 13.

Figure 14:
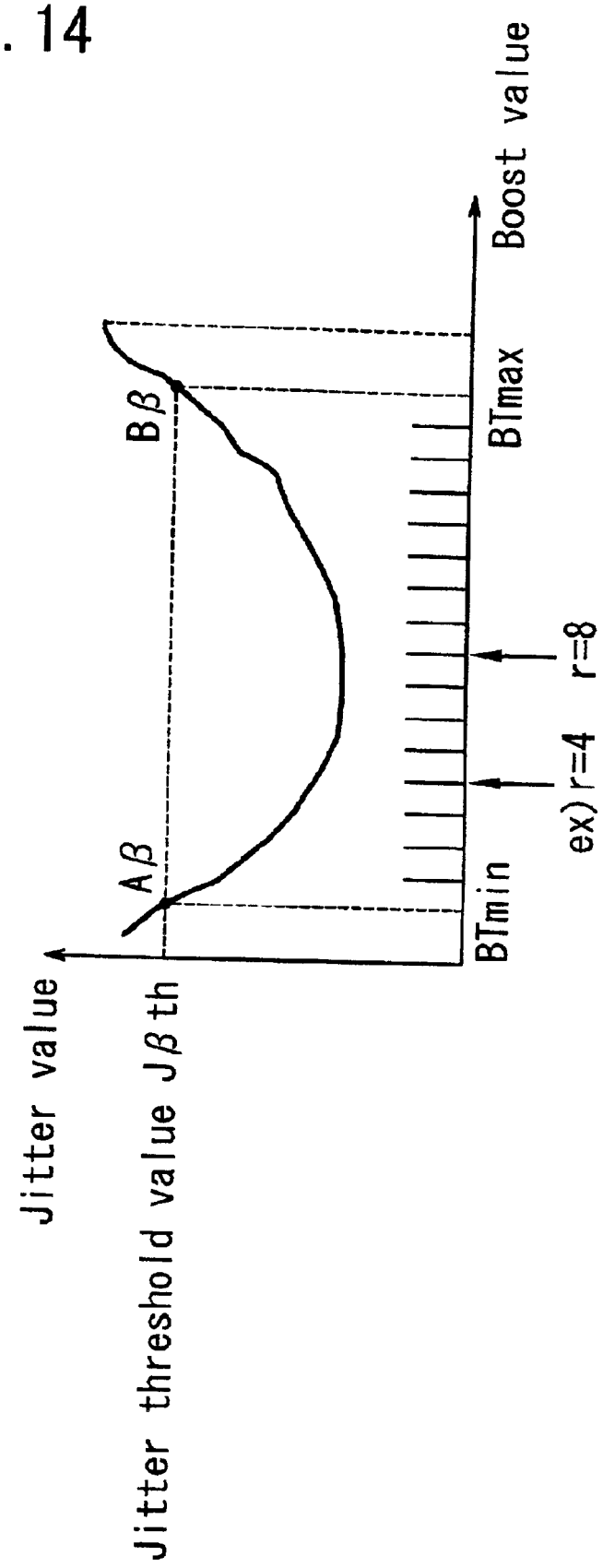
FIG. 14 is a drawing illustrating a specific example of optimum boost value establishment processing.
Figure 15:
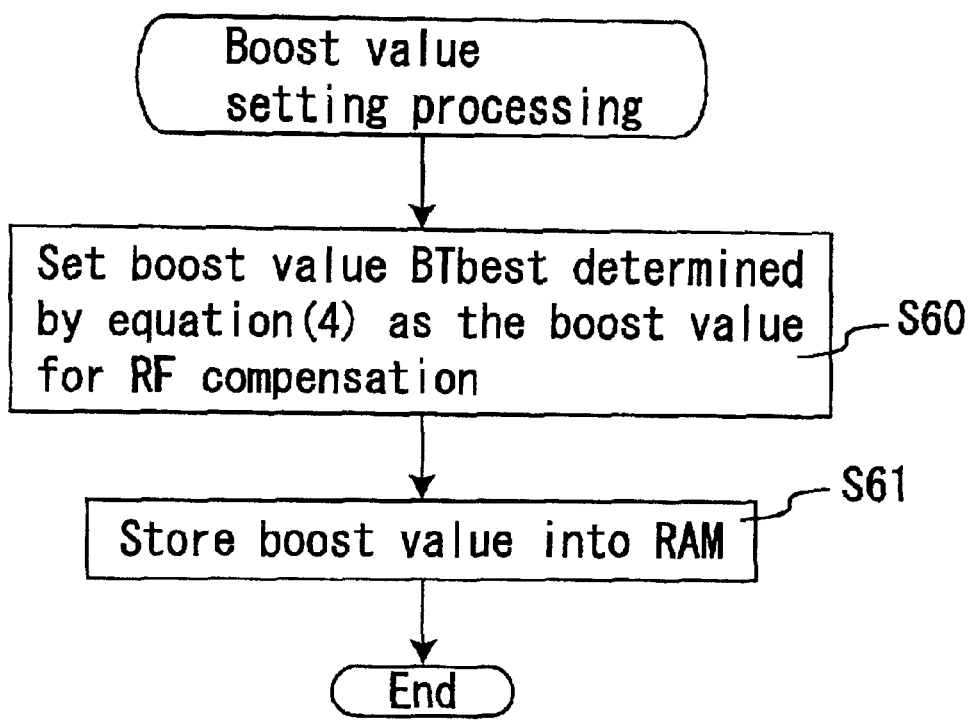
FIG. 15 is a flowchart showing the detailed flow of boost value setting processing in the boost value adjustment procedure according to an embodiment of the present invention.

As the processing performed at step S50, the servo characteristics setting section 76, as shown in FIG. 14, sets the boost value corresponding to the smaller first jitter value Aβ exceeding the jβth threshold as the first boost value BTmin, and sets the larger second jitter value Bβ exceeding the jβth threshold as the second boost value BTmax.

Next, as the processing performed at step S52, the servo characteristics setting section 76 establishes the optimum boost value BTbest, at which it is thought that the error rate will be the minimum, using the first boost value BTmin, the second boost value BTmax, and a prescribed coefficient value r that is pre-stored in the EEPROM 79, applying the Equation (4) given below.

$$BTbest=BTmin+(BTmax-BTmin)r/16 \qquad (4)$$

Figure 4:
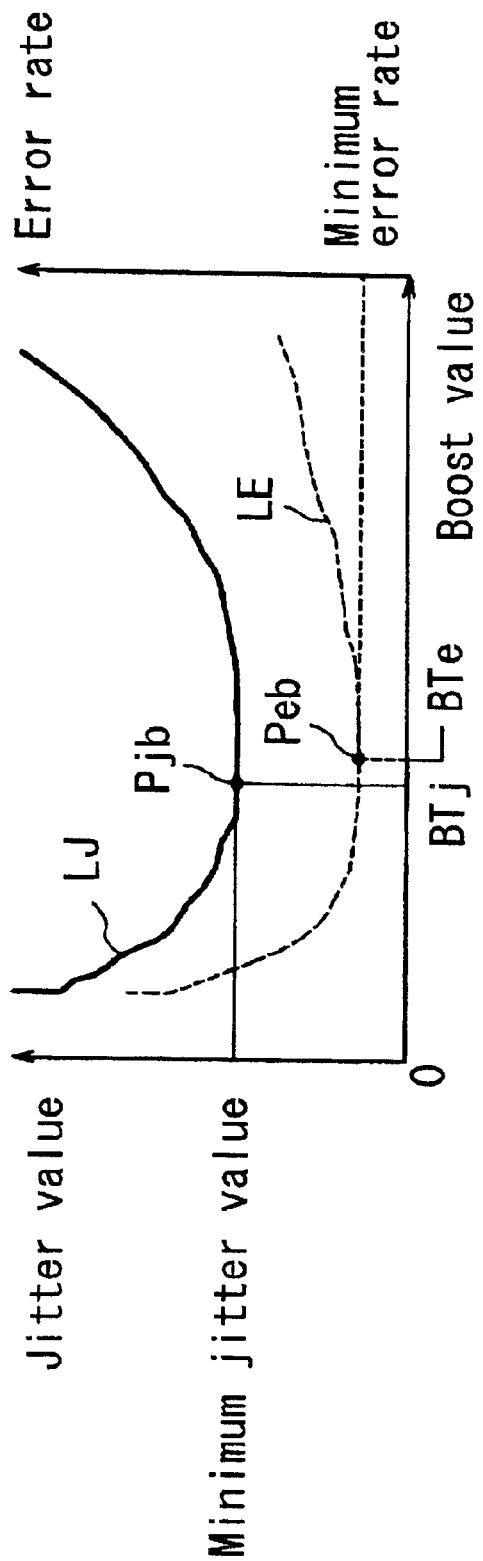
FIG. 4 is a drawing illustrating the relationship between a jitter value with respect to a boost value for compensating an RF signal level and a data error rate.

In the above equation, the coefficient r, as shown in FIG. 4, is one of integers from 0 to 15 prepared beforehand in the EEPROM 79, for the purpose of establishing the boost value at which point is to be taken as the optimum boost value BTbest, in the case in which the span between the first boost value BTmin and the second boost value BTmax is divided by 16. This coefficient r is selected in response to the various adjustment items and, for example, in the case in which the central point boost value between the first and second boost values BTmin and BTmax is to be taken as the optimum boost value BTbest, r would be 8. In the case in which a value of boost that is ¼ of the span between the first boost BTmin and the second boost BTmax is to be taken as the optimum boost value BTbest, r would be selected as 4. The denominator 16 in Equation (4) corresponds to the number of divisions taken between the first and second boost values BTmin and BTmax, as shown in FIG. 14.

After establishing the optimum boost value BTbest as described above, the processing flow proceeds to the boost value setting processing of step S6 of FIG. 5.

Boost Value Setting Processing Flow

Referring to FIG. 16, the flow of boost value setting processing at step S6 of FIG. 5 is as described below.

When the optimum boost value BTbest is established by the processing of step S5, as the processing performed at step S60 the servo characteristics setting section 76 sets the optimum boost value BTbest determined by the Equation (4) as the boost value in the RF compensation block 70.

Because the boost value set as described above can be used in processing other than the boost compensation performed by the RF compensation block 70, the servo characteristics setting section 76 executes step S76 to store this boost value into the RAM 78.

By doing this, the boost value adjustment procedure in an optical disc apparatus according to this embodiment of the present invention is completed.

SUMMARY OF THE EMBODIMENT

As described above in detail, according to the embodiment of the present invention, the minimum jitter value is measured each time the optical disc 50 is mounted or each time playback or the like is performed, this minimum jitter value being multiplied by a prescribed ratio β to establish the jitter threshold value Jβth, and a first boost value BTmin and a second boost value BTmax exceeding this jitter threshold value Jβth are applied to a prescribed equation so as to set the optimum boost value BTbest, the result being that it is possible to quickly and accurately detect the optimum boost value BTbest for, for example, the RF compensation, thereby enabling the achievement of good boost compensation.

It will be readily understood that the foregoing description is merely an exemplary embodiment of the present invention, that it in no way restricts the present invention to the above-noted embodiment, and that the present invention can be embodied in a variety of ways, keeping within the technical concept of the present invention. Additionally, while the above-described embodiment uses the example of adjustment of a boost value for the purpose of RF compensation, it will be understood that the present invention is not restricted to this application, and can be applied as well to the adjustment of skew, or focus bias, or the like.

What is claimed is:

1. An optical disc apparatus in which a laser beam from an optical pickup is shone onto a recording surface of an optical disc, and information is read from the optical disc, comprising:

a servo constant changing section, which successively changes a servo constant;

a jitter measurement section, which measures a jitter value of an output signal from the optical pickup;

a minimum jitter measurement section, which establishes a minimum jitter value from each jitter value measured in response to a successively changed servo constant;

a jitter threshold value setting section, which sets a jitter threshold value by multiplying the minimum jitter value by a prescribed ratio;

a servo constant establishing section, which of jitter values measured in correspondence to a successively changed servo constant, sets at least two jitter values substantially equal to the jitter threshold value, and establishes a servo constant corresponding to the set jitter values; and an optimum servo constant setting section, which, based on the servo constant corresponding to the minimum of two jitter constants, sets an optimum servo constant.

2. The optical disc apparatus according to claim 1, further comprising:

a servo constant initialization section, which sets the servo constant to a prescribed initial value; and wherein the servo constant changing section successively changes a servo constant from the prescribed initial value in a direction in which the servo constant is increased and in a direction in which the servo constant is decreased.

3. The optical disc apparatus according to claim 1, wherein the servo constant establishing section terminates operation of changing the servo constant when the servo constant reaches a pre-established value, and the jitter measurement section terminates operation of jitter measurement when the jitter value exceeds the jitter threshold value a prescribed number of times in a row.

4. The optical disc apparatus according to claim 1, further comprising:

a smoothing section, which smoothes dispersion in each jitter value measured in correspondence to the successively changed servo constant, and wherein the servo constant establishing section sets the at least two jitter values from among each jitter value after the smoothing.

5. The optical disc apparatus according to claim 1, wherein the jitter measurement section measures a plurality of jitter values for a single servo constant, and of the plurality of jitter values sets a total of each jitter value after eliminating the maximum value therefrom as a jitter value corresponding to the single servo constant.

6. The optical disc apparatus according to claim 1, wherein the servo constant changing section sets a compensation value for the purpose of compensating a level of an output signal from the optical pickup as the servo constant.

7. A method for servo adjustment of a servo characteristic in an optical disc apparatus in which a laser beam from an optical pickup is shone onto a recording surface of an optical disc, and information is read from the optical disc, comprising steps of:

successively changing a servo constant;

measuring a jitter value of an output signal from the optical pickup;

establishing from each jitter value measured in correspondence to the successively changed servo constant a minimum jitter value;

multiplying the minimum jitter value by a prescribed ratio and setting a jitter threshold value;

setting at least two jitter values substantially equal to the jitter threshold value from among each jitter value measured in correspondence to the successively changed servo constant and establishing a servo constant corresponding to the set jitter value; and setting an optimum servo constant based on the servo constant corresponding to the minimum two jitter values.

8. The method for servo adjustment according to claim 7, further comprising steps of:

setting the servo constant to a prescribed initial value; and successively changing the servo constant from the prescribed initial value in a direction in which the servo constant is increased and in a direction in which the servo constant is decreased.

9. The method for servo adjustment according to claim 7, further comprising steps of:

terminating servo constant changing operation when the servo constant reaches a pre-established value; and terminating jitter measurement operation when the jitter value exceeds the jitter threshold value a prescribed number of times in a row.

10. The method for servo adjustment according to claim 7, further comprising steps of:

smoothing dispersion of each jitter value measured in correspondence to a successively changed servo constant; and setting at least two jitter values from among jitter values after the smoothing.

11. The method for servo adjustment according to claim 7, further comprising steps of:

measuring a plurality of jitter values for a single servo constant; and setting a total of each jitter value after eliminating the maximum value therefrom as a jitter value corresponding to the single servo constant.

12. The method for servo adjustment according to claim 7, further comprising a step of setting a compensation value for compensating an output level of an output signal from the optical pickup as the servo constant.

13. A computer-readable recording medium recording a servo adjustment program of a servo characteristic in an optical disc apparatus in which a laser beam from an optical pickup is shone onto a recording surface of an optical disc, and information is read from the optical disc, the servo adjustment program comprising and conduct a computer execute the steps of:

successively changing a servo constant;

measuring a jitter value of an output signal from the optical pickup;

establishing from each jitter value measured in correspondence to the successively changed servo constant a minimum jitter value;

multiplying the minimum jitter value by a prescribed ratio and setting a jitter threshold value;

setting at least two jitter values substantially equal to the jitter threshold value from among each jitter value measured in correspondence to the successively changed servo constant and establishing a servo constant corresponding to the set jitter value; and setting an optimum servo constant based on the servo constant corresponding to the minimum two jitter values.

14. The computer-readable recording medium according to claim 13, the servo adjustment program further comprising and conduct a computer execute the steps of:

setting the servo constant to a prescribed initial value; and successively changing the servo constant from the prescribed initial value in a direction in which the servo constant is increased and in a direction in which the servo constant is decreased.

15. The computer-readable recording medium according to claim 13, the servo adjustment program further comprising and conduct a computer execute the steps of:

terminating servo constant changing operation when the servo constant reaches a pre-established value; and terminating jitter measurement operation when the jitter value exceeds the jitter threshold value a prescribed number of times in a row.

16. The computer-readable recording medium according to claim 13, the servo adjustment program further comprising and conduct a computer execute the steps of:

smoothing dispersion of each jitter value measured in correspondence to a successively changed servo constant; and setting at least two jitter values from among jitter values after the smoothing.

17. The computer-readable recording medium according to claim 13, the servo adjustment program further comprising and conduct a computer execute the steps of:

measuring a plurality of jitter values for a single servo constant; and setting a total of each jitter value after eliminating the maximum value therefrom as a jitter value corresponding to the single servo constant.

18. The computer-readable recording medium according to claim 13, the servo adjustment program further comprising and conduct a computer execute the step of: setting a compensation value for compensating an output level of an output signal from the optical pickup as the servo constant.

19. A servo adjustment program of a servo characteristic in an optical disc apparatus in which a laser beam from an optical pickup is shone onto a recording surface of an optical disc, and information is read from the optical disc, comprising and conduct a computer execute the steps of:

successively changing a servo constant;

measuring a jitter value of an output signal from the optical pickup;

establishing from each jitter value measured in correspondence to the successively changed servo constant a minimum jitter value;

multiplying the minimum jitter value by a prescribed ratio and setting a jitter threshold value;

setting at least two jitter values substantially equal to the jitter threshold value from among each jitter value measured in correspondence to the successively changed servo constant and establishing a servo constant corresponding to the set jitter value; and setting an optimum servo constant based on the servo constant corresponding to the minimum two jitter values.

* * * * *